Jan. 21, 1964     R. J. STANTON     3,118,406
APPARATUS FOR WELDING EDGES OF TUBES
Filed Sept. 9, 1959     3 Sheets-Sheet 2
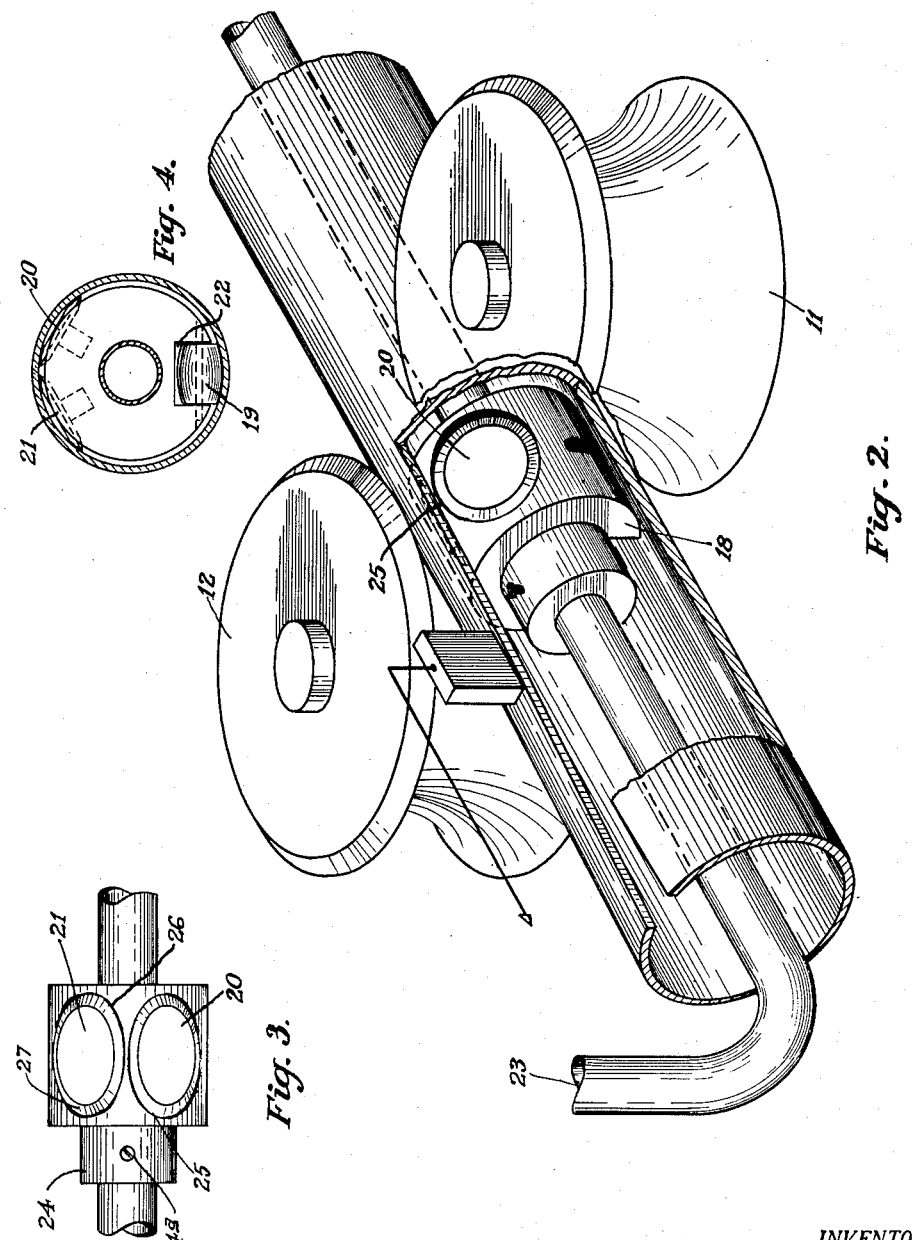
INVENTOR:
ROBERT J. STANTON
BY George B. Oujevolh

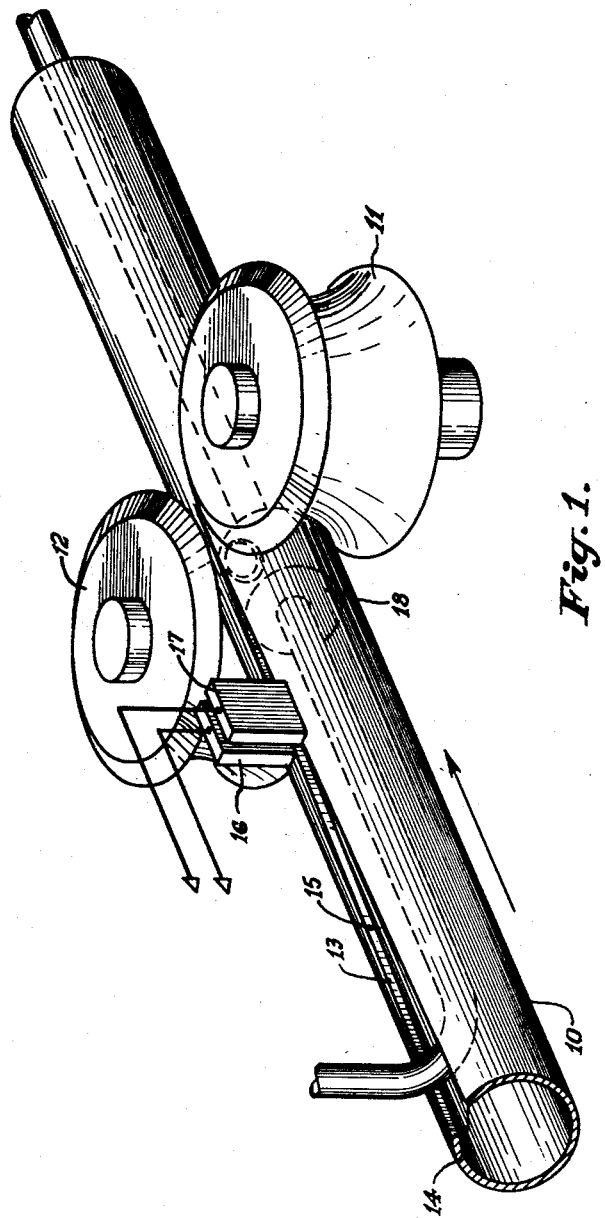

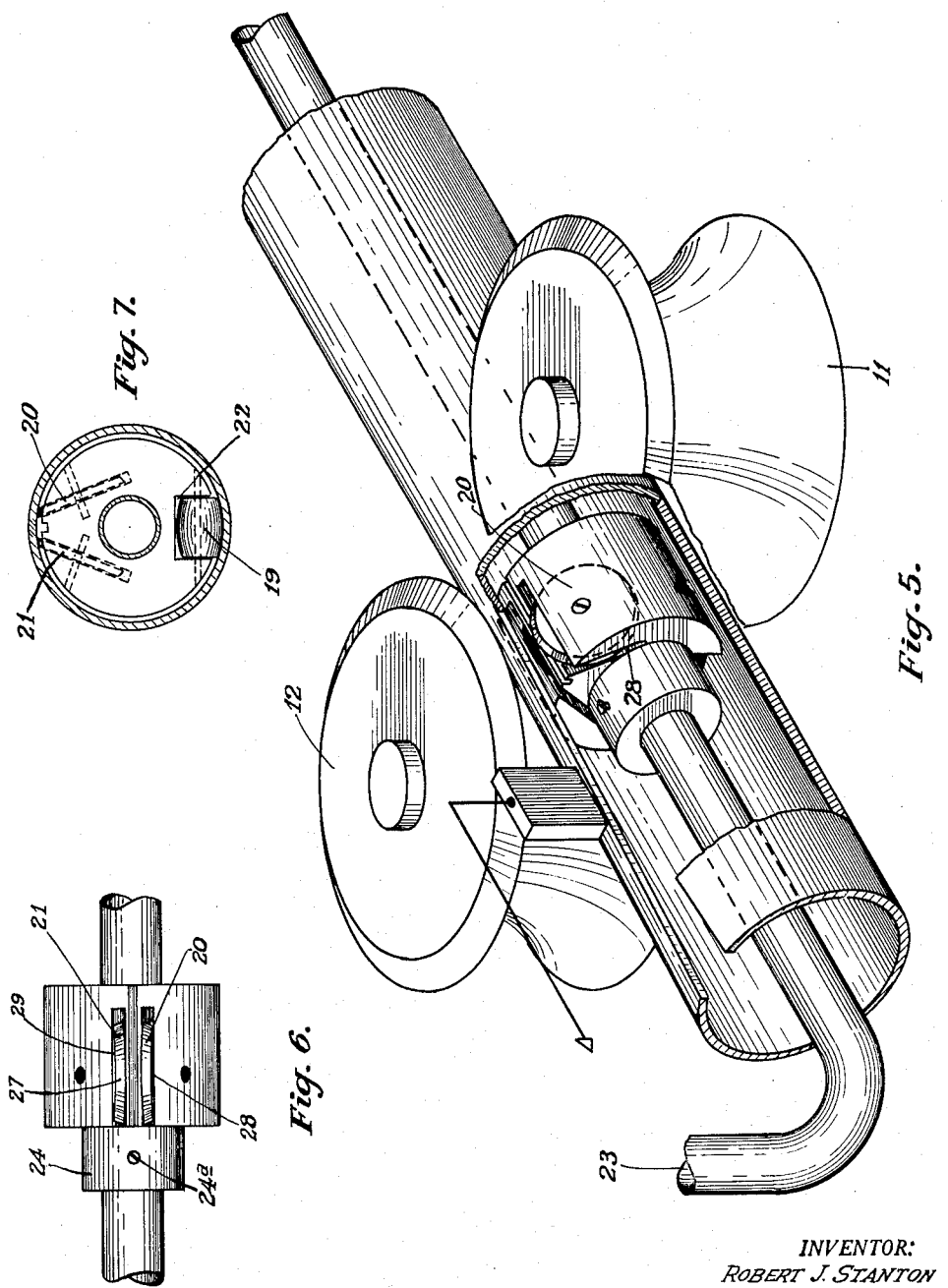

United States Patent Office 3,118,406
Patented Jan. 21, 1964

3,118,406
APPARATUS FOR WELDING EDGES OF TUBES
Robert J. Stanton, Brooklyn, N.Y., assignor to American Machine & Foundry Company, New York, N.Y., a corporation of New Jersey
Filed Sept. 9, 1959, Ser. No. 839,021
3 Claims. (Cl. 113—33)

The present invention relates to the production of large diameter welded tubing, and, more particularly, to the production of such tubing by welding the opposed longitudinal edges in such tubing.

It is well known that welded tubing can be produced by advancing an endless flat strip of metal past a series of opposed gradually curved forming rolls, so that the width of the strip is gradually curved and shaped into a tube having a gap or slit down the middle thereof. It is also common practice in the manufacture of tubing by this method to bring the two opposite edges of the tubing metal together at a point where the said edges are welded together, e.g., a weld point. The welding of the longitudinal seams may be accomplished by supplying welding current, e.g., high frequency alternating current, to a pair of contacts which respectively engage the opposite sides of the tube metal just shortly prior to the point where the gap at the edges is brought together. The welding current can be caused to flow principally along the V-shaped path formed by the two opposite edges, the tube being welded at the apex of the V, i.e., the weld point. In order to achieve a sound even weld, without skips or holes, it is essential that the longitudinal edges be firmly brought together at the weld point by squeeze rolls. Particularly in the case of a butt weld, proper alignment of the edges, butt to butt, is essential. Since, in commercial production, all tube being formed is advanced at a fairly rapid rate of speed, powerful forces act at the weld point, and a good weld can be achieved only by the proper absorption and distribution of all the forces acting on the tube at this point. Thus, in the workpiece tubing which can be considered as an instantaneous load, squeezed by opposing levers, e.g., pliers, counterforces are created which are to be absorbed by the squeeze rolls. In welding tubing of large diameter, where the wall of the tube is relatively thin, i.e., tubing wherein the ratio of tube diameter to wall thickness is of the order of about 75 to 1 or greater, it is often difficult to absorb the forces acting at or near the weld point. Therefore, not only are guiding means required to guide the welded seam, but additional supporting means are required which will absorb and more equally distribute these forces. However, with squeeze rolls and contacts already in the vicinity of the weld point, the placing of additional supporting means in this vicinity is extremely difficult.

Although many attempts were made to overcome the foregoing difficulties and other disadvantages, none, as far as I am aware, was entirely successful when carried into practice commercially on an industrial scale.

It has now been discovered that additional supporting means, e.g., a supporting plug or boss can be provided for the tubing being formed, which can be so disposed as to absorb some of the aforementioned forces.

It is an object of the present invention to provide means for the manufacture of large diameter tubing.

It is a further object of the present invention to provide a device which will lend support to tubing which is being welded.

The invention also contemplates providing internal support means for tubing being welded.

In general, the present invention contemplates providing an internal cylindrical boss in the vicinity of the weld point, a lower bearing mounted in said boss adapted to internally facilitate the passage of the advancing tube being welded, and a plurality of upper rollers mounted in said boss adapted to engage the tube in the vicinity of the weld point to provide support for the welded tubing, the diameter of said upper rollers being of the order of about equal to, or greater than, the inner radius of the tube being welded, and so disposed about the boss as to direct the effect of the counterforce exerted by the welded load towards the center of the boss to be thereby absorbed.

Various further and more specific objects, features and advantages of the invention will appear from the description given below, taken in connection with the accompanying drawings, illustrating by way of example certain preferred forms of the invention.

In the drawings:
FIG. 1 is a somewhat schematic perspective view of the invention.
FIG. 2 is a longitudinal view, similar to FIG. 1, having a portion of the tube cut away showing one embodiment of the invention herein contemplated in operation.
FIG. 3 is a top view of the invention shown in FIG. 2.
FIG. 4 is a cross-sectional view of the device shown in FIG. 3, in operation.
FIG. 5 is a view similar to FIG. 2, but showing another embodiment of the invention herein contemplated.
FIG. 6 is a top view of the invention shown in FIG. 5.
FIG. 7 is a cross-section view of the device shown in FIG. 6, in operation.

Referring to the drawing in further detail, the tube being welded is indicated at 10 advancing in the direction of the arrow shown through a tube mill. On opposite sides, near the vicinity of the weld point are a pair of pressure rollers, 11 and 12, which engage opposite sides of the tubing so that the opposite edges 13 and 14, are firmly brought together forming a V-shaped gap, 15. The contacts by which welding current is applied to the gap edges are indicated at 16 and 17.

While with the apparatus as shown in FIG. 1, the V-shaped gap in the tubing is indicated as extending along the upper side of the tubing, it will be understood that this is for convenience of showing only and that the gap might be at other places, either at one side or along the bottom of the tubing, and in construing the appended claims, such other possibilities should be considered as coming within the scope of the invention.

Considerable pressure is exerted by pressure rollers, 11 and 12, not only on both sides of the tube around its circumference, but especially at the weld point. As a result of this pressure, and particularly in the case of large diameter tubing, there is a tendency on the part of the gap edges to buckle inwardly, because the weakest part of the workpiece load, i.e., the area being welded, is receiving the most pressure. To absorb these forces acting on the gap edge and the weld point, there is provided an internal boss 18, cylindrically shaped, the overall diameter of which is slightly smaller than the internal diameter of the tube, i.e., the inner diameter of the tube is about ⅛ inch to ½ inch larger than the diameter of the inner boss. Inner boss 18 is retained in place under the vicinity of the weld point and means are provided to so hold the inner boss. Since it is customary to provide a cooling fluid to various inner portions of the tube and other devices therein, advantageously, conduit 23, used to provide such cooling fluid may be used as the retaining means for inner boss 18, as shown in FIGS. 2 and 5, the inner boss being secured to the conduit by appropriate fastening means, e.g., a collar 24 and screw 24a (FIG. 6). At the bottom of the boss, there is provided a bearing, e.g., a small diameter lower roll 19, adapted to rotate in the direction of the advancing tube facilitating the passage thereof. This roller is advantageously located directly beneath the longitudinal gap or seam in the tubing and is set in a lower housing 22 located under conduit 23.

To support the opposed sides of the welded area inside the tube, and furnish the mechanical link between internal boss 18 and welded tube 10 and transmit the forces acting on the workpiece load to the boss, the function of which is to house the moment of forces acting on the load, upper rollers 20 and 21, preferably substantially flat, are provided. The larger the diameter of said upper rollers, the slower the r.p.m. of the rollers, the less they are subjected to wear and tear, the more contacting support these rollers can furnish to the workpiece. Furthermore, the closer the center of these rollers is to the center of inner boss 18, the more effectively will be the moment of forces created therein. To increase the diameter of rollers 20 and 21, these rollers can be angularly disposed relative to the tube diameter which passes through the weld point, i.e., forming an inverted V over lower roller 19 and straddling conduit 23 which passes through the inner boss. There are two ways that these upper rollers 20 and 21 may be advantageously disposed. As illustrated in FIGS. 2, 3 and 4, upper cylindrical recess 25 and 26 may be provided in inner boss 18, converging upwards towards each other and almost tangent. These cylindrical recesses are adapted to house rollers 20 and 21, the rollers almost meeting tangentially, wing-like, under the welded gap. To further increase the diameter of upper rollers 20 and 21, these rollers may be disposed in the inner boss as depicted in FIGS. 5, 6 and 7, i.e., individual vertical upper housings, or, slots 28 and 29 are provided for rollers 20 and 21 in the inner boss. These slots are placed as close as possible along the sides of conduit 23 which passes through the inner boss. In the case of the very large diameter tubing, about 10 inches or over, sufficient support to the tube to absorb the forces acting on the weld point may be obtained when rollers 20 and 21 are disposed vertically or substantially so, i.e., when the relative diameter of said rollers is comparatively slightly less than the inner radius of the tubing. In either embodiment, upper rollers 20 and 21 should advantageously have a tapered periphery 27, so as to more effectively provide support to the moving tube. In addition to inner boss 18, it may be preferable to also provide means over the tubing to furnish support in the vicinity of the weld point, e.g., additional outer rollers over the weld point or between the weld point and the scarfing station.

It is observed, therefore, that the present invention provides for an improvement in an apparatus for the production of metal tubing, wherein a formed tube, having a longitudinal gap, is finished by advancing said tube past a welding station and welding together the opposed edges 13 and 14 of said tube, which improvement comprises, in combination, a pair of pressure rollers 11 and 12 acting as opposing levers which engage opposite sides of the tubing, which is treated as the load, so that opposite edges 13 and 14 are firmly squeezed together forming a V-shaped gap; a welding station in the vicinity of said V-shaped gap adapted and designed to weld the region of said opposed edges which have been brought together by said pressure rollers; an internal boss 18 within said tube, the overall diameter of said boss being slightly less, e.g., ⅛″ to ½″ less, than the internal diameter of said tube, retaining means 23, e.g., a conduit adapted to provide cooling fluid to the interior of the tube, passing through the center thereof retaining said internal boss 18 in the vicinity of the apex of said V-shaped gap; a lower bearing or roller 19 rotatably set in a lower housing 22 of said inner boss, preferably under said retaining means or conduit, designed to engage the advancing tubing and facilitate the passing of the tube past the inner boss; and, a plurality of upper rollers 20 and 21, rotatably set in the upper portion of said inner boss, adapted to engage opposed sides of the welded area at the underside of the tube and so angularly disposed to a tube diameter passing through the weld point, e.g., said rollers almost meeting tangently at the weld point as to permit the diameter of said rollers to be of sufficient length as to contact a large volume of said inner boss so as to transmit thereto or form therein the moment of the cumulative effect of the principal forces acting on the load.

As used herein, the expression "large diameter tubing" is relative, and refers generally to tubing where the ratio of tube diameter to wall thickness is of the order of 75 to 1 or greater, usually where the diameter is in the order of 4 inches or greater.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Apparatus for welding together the edges of a longitudinal gap in metal tubing which comprises: means for longitudinally advancing the tube while bringing said edges together at a weld point in a narrow V-shaped formation, a boss adapted to be disposed within the tube at the weld point, bearing means mounted in said boss adapted to engage the inner surface of the tube diagonally opposite the weld point to facilitate the passage of the advancing tube, said boss being formed with a pair of recesses converging upwardly towards each other and towards the interior surface of said tube at the respective sides of the weld point, and a disc-like roller rotatably positioned in each of said recesses and adapted to engage the interior surface of said tube adjacent the edges thereof at the weld point to provide support therefor.

2. Apparatus for welding together the edges of a longitudinal gap in metal tubing which comprises: means for longitudinally advancing the tube while bringing said edges together at a weld point in a narrow V-shaped formation, said means including a pair of pressure rollers adapted to engage opposite sides of the tube, a boss adapted to be disposed within the tube at the weld point and having an overall diameter slightly less than the internal diameter of the tube, bearing means mounted in said boss and adapted to engage the inner surface of the tube diagonally opposite the weld point to facilitate the passage of the advancing tube, said boss being formed with a pair of angularly disposed slots converging towards the inner surface of said tube adjacent the weld point, and a roller mounted in each of said slots, respectively, each roller being formed with a bearing surface adapted to engage the inner surface of the tube adjacent the weld point to provide support for the tube.

3. Apparatus for welding together the edges of a longitudinal gap in metal tubing which comprises: means for longitudinally advancing the tube while bringing said edges together at a weld point in a narrow V-shaped formation, said means including a pair of pressure rollers adapted to engage opposite sides of the tube, a boss adapted to be disposed within the tube at the weld point and having an overall diameter slightly less than the internal diameter of the tube, bearing means mounted in said boss and adapted to engage the inner surface of the tube diagonally opposite the weld point to facilitate the passage of the advancing tube, said boss being formed with a pair of recesses adjacent the weld point, and a roller mounted in each of said recesses, respectively, and adapted to engage the inner surface of the tube adjacent the weld point to provide support for the tube, the diameter of each such roller being about equal to the inside radius of the tube being welded.

References Cited in the file of this patent

UNITED STATES PATENTS

| | | |
|---|---|---|
| 681,694 | Gorton | Sept. 3, 1901 |
| 1,837,494 | Sessions | Dec. 31, 1931 |
| 1,850,176 | Lawson | Mar. 22, 1932 |
| 1,983,930 | Carlsen | Dec. 11, 1934 |
| 2,139,771 | Riemenschneider | Dec. 13, 1938 |
| 2,417,594 | Fleche | Mar. 18, 1947 |
| 2,580,502 | Anderson | Jan. 1, 1952 |
| 2,613,303 | Babbitt | Oct. 7, 1952 |
| 2,833,910 | Stanton et al. | May 6, 1958 |
| 2,890,321 | Nitkiewicz | June 9, 1959 |
| 2,934,981 | Pearson | May 3, 1960 |

FOREIGN PATENTS

| | | |
|---|---|---|
| 426,848 | Great Britain | Apr. 10, 1935 |
| 644,274 | Germany | Apr. 28, 1937 |